No. 840,097. PATENTED JAN. 1, 1907.
C. W. WAYMIRE.
ACETYLENE GAS GENERATOR.
APPLICATION FILED FEB. 23, 1906.
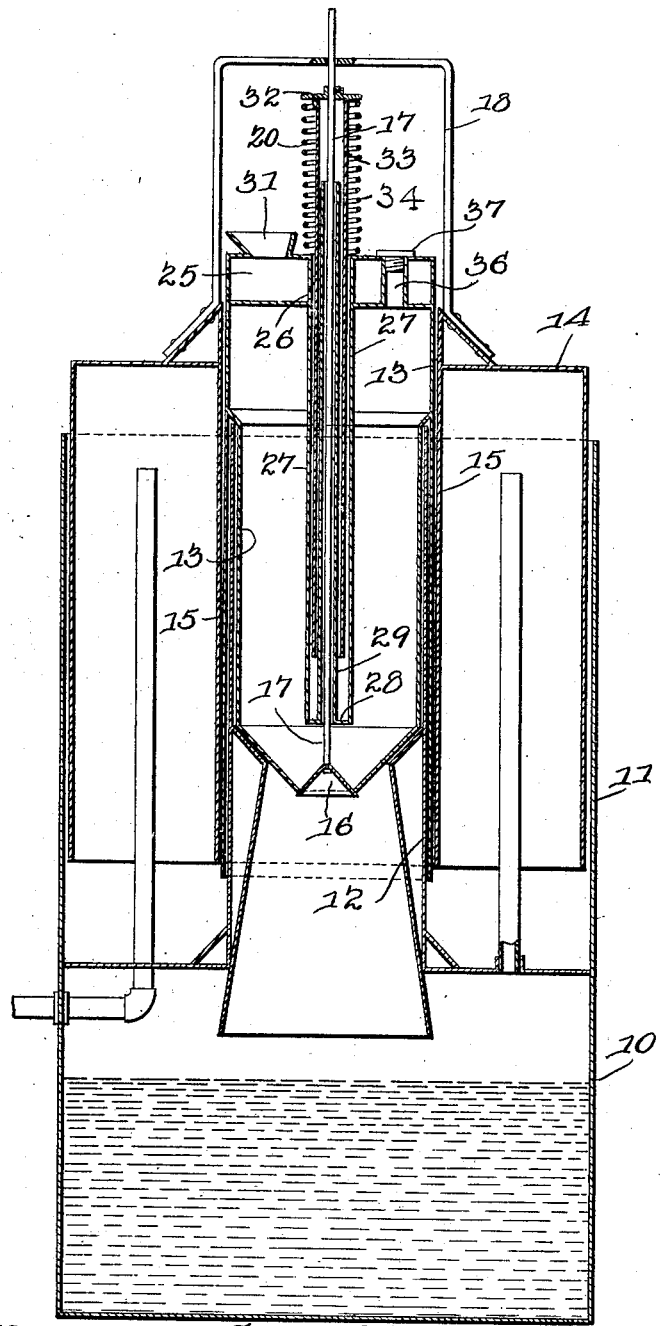
WITNESSES:
Cyrus W. Waymire, INVENTOR.
By C. A. Snow & Co.
ATTORNEYS

UNITED STATES PATENT OFFICE.

CYRUS W. WAYMIRE, OF NORWALK, CALIFORNIA.

ACETYLENE-GAS GENERATOR.

No. 840,097.  Specification of Letters Patent.  Patented Jan. 1, 1907.

Application filed February 23, 1906. Serial No. 302,555.

*To all whom it may concern:*

Be it known that I, CYRUS W. WAYMIRE, a citizen of the United States, residing at Norwalk, in the county of Los Angeles and State of California, have invented a new and useful Acetylene-Gas Generator, of which the following is a specification.

This invention relates to acetylene-gas generators, and has for its principal object to provide a structure in which the supply of carbid may be renewed or replenished without danger of allowing any air to enter the gasometer or the generating-tank.

A further object of the invention is to provide a device in which the valve-operating rod extends directly through the center of the carbid-holder and is provided with proper means for sealing in water to prevent the escape of gas, thus avoiding the necessity of employing a large number of links, levers, and other connecting devices between the valve and the exterior valve-operating mechanism.

With these and other objects in view, as will more fully hereinafter appear, the invention consists in certain novel features of construction and arrangement of parts hereinafter fully described, illustrated in the accompanying drawing, and particularly pointed out in the appended claim, it being understood that various changes in the form, proportions, size, and minor details of the structure may be made without departing from the spirit or sacrificing any of the advantages of the invention.

The accompanying drawing illustrates in sectional elevation an acetylene-gas generator embodying the invention.

The generating-tank 10 is arranged below and supports the tank 11 of the gasometer, said tank 11 being annular in sectional plan, its inner wall 12 being arranged to extend around the lower portion of the carbid-holder 13. The gasometer-tank is arranged to contain a quantity of water, as usual, and the bell 14 is sealed therein and moves up and down in the usual manner as the quantity of gas varies.

The carbid-holder 13 is provided with an outer wall 15, which is also sealed in the water of the gasometer in order to prevent any leakage. The bottom of the carbid-holder tapers toward a centrally-disposed discharge-opening, which may be closed by a conical valve 16, and said valve is supported by a rod 17, the upper end of which extends through an opening formed in an inverted-U-shaped frame 18 that is carried by the gasometer-bell.

At the top of the carbid-holder is a water-chamber 25, which communicates, through a port 26, with a tube 27, that extends down within the carbid-holder to a point near the valve and is provided at its lower end with a horizontal flange 28, by which it is connected to a smaller pipe 29, that is concentric with the pipe 27, said pipe 29 extending to a point above the top of the carbid-holder and being open at its upper end. This inner pipe 29 forms a guide for the valve-rod, and the two tubes 27 and 29 form a water-compartment which is constantly filled with water from the chamber 25, the supply of water in the latter being readily renewed through a filling-opening 31 at the top of the carbid-holder. Secured to the upper portion of the valve-rod 17 is an enlarged disk 32, carrying a depending tube 33, the disk being rigidly secured to both the tube and the rod to form an air-tight connection that will prevent any escape of gas at the top of said tube. This tube 33 passes down and is immersed in the water contained between the tubes 27 and 29, so that the valve-rod is effectually sealed and may be vertically moved without danger of the escape of gas or the entrance of air.

Between the disk or cap 32 and the top of the carbid-holder is a helical compression-spring 34, that serves to hold the valve in closed position until on descent of the bell of the gasometer the frame 18 engages the disk 32 and forces the tube 33 and valve-rod down against the resistance offered by the spring.

In order to replenish the carbid-holder, a tubular passage 36 is formed through the water-chamber 25, and the top of said passage is closed by a removable cap 37, that may be opened at any time the valve 16 is closed and the carbid-supply renewed without danger of allowing any air to enter the generating-tank or the gasometer.

In the operation of the device it will be seen that as the gasometer-bell descends the member 18 will engage with the cap 32 and will force the tube 33 and the valve-rod 17 down against the stress of spring 34, this movement being transmitted to the valve 16 and forcing the latter to open position, so that a quantity of carbon will be allowed to fall into the generating-tank. As soon as gas is generated the bell will rise, and as the frame 18 moves upward the spring 34 will expand and move the valve to its closed position.

With a device of this character it is possible to replenish the carbid-supply without danger of admitting air to either the generating-tank or the gasometer, and at the same time no gas can escape except the relatively small quantity of gas that is contained within the carbid-holder.

I claim—

In acetylene-gas apparatus, the combination with a generating-tank, of a gasometer arranged on top of the generating-tank, the bell of the gasometer being annular in form, a carbid-holder having a pendent tube or annular flange that is sealed in the water of the gasometer-tank, a pair of concentric annular tubes extending downward from the top of the carbid-holder and having their lower ends connected to each other to form an annular water-space, a filling and overflow chamber arranged at the top of the carbid-holder and in communication with said annular water-space, a valve-rod extending through the innermost tube, a valve carried thereby, a sealing-tube carried by the valve-rod and having its lower end dipping into said annular water-space, the top of the tube having a closing-cap, a spring extending between said closing-cap and the top of the carbid-holder and tending to maintain the valve in closed position, and a valve-operating frame carried by the carbid-holder and having an opening for the passage of the valve-rod.

In testimony that I claim the foregoing as my own I have hereto affixed my signature in the presence of two witnesses.

CYRUS W. WAYMIRE.

Witnesses:
 E. P. TRUITT,
 L. L. BURKE.